(12) United States Patent
Gomez Pinedo

(10) Patent No.: US 9,816,669 B2
(45) Date of Patent: Nov. 14, 2017

(54) FILTERING DEVICE SUITABLE FOR BEING COUPLED TO A SUCTION TURBINE FOR SUCKING UP EXCREMENT AND VACUUM CLEANER INCLUDING SAID FILTERING DEVICE

(71) Applicant: Juan Jose Gomez Pinedo, Los Barrios (ES)

(72) Inventor: Juan Jose Gomez Pinedo, Los Barrios (ES)

( * ) Notice: Subject to any disclaimer, the term of this patent is extended or adjusted under 35 U.S.C. 154(b) by 762 days.

(21) Appl. No.: 14/365,125

(22) PCT Filed: Dec. 10, 2012

(86) PCT No.: PCT/ES2012/070854
§ 371 (c)(1),
(2) Date: Jun. 13, 2014

(87) PCT Pub. No.: WO2013/098447
PCT Pub. Date: Jul. 4, 2013

(65) Prior Publication Data
US 2014/0332099 A1 Nov. 13, 2014

(30) Foreign Application Priority Data

Dec. 26, 2011 (ES) .................................. 201132103
Jun. 15, 2012 (ES) .................................. 201230944

(51) Int. Cl.
*F17D 1/02* (2006.01)
*E01H 1/08* (2006.01)
*E01H 1/12* (2006.01)
*A47L 7/00* (2006.01)
*B01D 46/00* (2006.01)

(52) U.S. Cl.
CPC ................ *F17D 1/02* (2013.01); *A47L 7/009* (2013.01); *A47L 7/0061* (2013.01); *B01D 46/0005* (2013.01); *E01H 1/0836* (2013.01); *E01H 1/1206* (2013.01); *Y10T 137/794* (2015.04)

(58) Field of Classification Search
CPC ..... A47L 7/0061; A47L 7/009; E01H 1/1206; E01H 1/0836; B01D 46/0005
USPC ............................................ 15/246.2, 246.3
See application file for complete search history.

(56) References Cited

U.S. PATENT DOCUMENTS 3,866,264 A 2/1975 Engquist
2004/0194248 A1 10/2004 Holtz

FOREIGN PATENT DOCUMENTS

GB 2233218 A 1/1991

OTHER PUBLICATIONS

International Search Report and Written Opinion, PCT/ES2012/070854, dated Jun. 18, 2013, 8 pgs.

*Primary Examiner* — Andrew A Horton
(74) *Attorney, Agent, or Firm* — Hayes Soloway PC

(57) ABSTRACT

The object of the invention is a filtering device that can be coupled to a suction turbine (30) of the type used to suction pet faeces. Another object of the invention is the vacuum incorporated in said filtering device. The filtering device comprises an outer body (10) and a cartridge (20) that are partially disposed in the interior of the outer body (10) comprising an open front end (26) for suctioning the faeces (40) and a closed rear end (27), at least one opening (21) disposed on the surface (28) for the passage of the air flow (50) from the interior of the cartridge (20) to the interior of the outer body (10) and a filtering material (22).

19 Claims, 3 Drawing Sheets

FILTERING DEVICE SUITABLE FOR BEING COUPLED TO A SUCTION TURBINE FOR SUCKING UP EXCREMENT AND VACUUM CLEANER INCLUDING SAID FILTERING DEVICE

OBJECT OF THE INVENTION

The object of the invention is a filtering device that can be coupled to a suction turbine of the type used to suction pet faeces. Another object of the invention is the vacuum incorporated in said filtering device.

BACKGROUND OF THE INVENTION

Devices for collecting faeces comprising a motor and a suction turbine are known in the state of the art. These devices are based on turbines typically used in domestic vacuum cleaners and remain insufficient in terms of both power and features for collecting pet faeces, in addition to having an inappropriate size and weight for their portability.

This is due to the fact that they normally incorporate either filters made of a porous material or a bag of the type commonly used in domestic vacuum cleaners. As a result, the filter becomes saturated immediately upon actuating the turbine, considerably reducing absorption capacity, whereupon the device is incapable of removing the faeces in its entirety or, if a bag is used, it could break, soiling the interior of the device, which would then have to be cleaned by the user.

Further, removal of faeces from the device is complicated, as the device must be completely disassembled to access the interior thereof. Also, in many cases the user is obliged to clean part of the device, both mechanical elements (brushes, wheels, claws, etc.) and conduits extending to the collection area. In the case of bags, assembly thereof hampers operation of the device and, upon disassembly thereof, both the device and the user become soiled.

There are also devices in which it is necessary to replace both the suction conduits and the filtering and residue accumulation elements. This solution limits the portability of the device and complicates the use thereof, requiring storage of a greater number of spare parts.

In particular, patent GB2233218, for example, is known, which discloses a portable vacuum cleaner for dog faeces, elongated and equipped with a handle at an upper end and an opening at the opposite end, where the suctioning unit is disposed, which is composed of two fans actuated by two motors which are started on pressing the power button disposed on said handle. A disposal faeces collection device is connected to said second end, consisting of a truncated cone-shaped mouth wherein a porous faeces retention bag is disposed. However, this configuration creates a depression around the bag, which becomes inflated and can break. In light of the configuration adopted, the bag is assembled by means of two plastic parts that must be thrown away after each use, which makes the daily use of the product more expensive.

U.S. Pat. No. 661,873 is also known, which discloses a device for suctioning dog faeces equipped with a power unit in which a fan actuated by a motor is mounted, whereto a disposable suction tube is connected through an opening having a locking seal. In the interior of the device, the conduit is in turn connected to a bag. With this solution, it is easy for both the device and the user to become soiled on disconnecting the suction conduit and the collection bag, due to the fact this connection is always in the interior of the device, as the suction tube will become soiled by the suctioned residue on removing the bag.

Patent US2007/0024070 is also known, which discloses a device for collecting animal faeces by means of suction and the mechanical action of rotary brushes. These brushes are soiled after each use, hence a device that uses a soap-based solution for washing the brushes and wheels thereof is incorporated.

Lastly, patent US2004/0194248 discloses a vacuum for suctioning animal faeces, which incorporates a disposable faeces collection cartridge at the closed end, consisting of a cylinder open at one end and closed by means of a filter having the same cross-section as the conduit at the other end. This solution limits the filtering area to the cross-section of the conduit, quickly saturating the filter. Also, the cartridge is configured in such a manner that extraction thereof from the cartridge is complex.

The filtering device object of the invention resolves the foregoing drawbacks.

DESCRIPTION OF THE INVENTION

An object of the invention is a filtering device that can be coupled to a suction turbine for suctioning faeces. Said device is therefore removable from the suction turbine and can be disposed of once used to collect faeces.

The device object of the invention conveys the faeces, collects them, filters and channels the air and retains the residue on disconnecting the device. This prevents any of the parts of the device, both internal and external, from coming into contact with the residue. It also allows clean removal of the assembly without coming into contact with the residue, as part of the suction conduit that can be handled without opening the device.

The device is characterised in that it comprises the following two elements.
  an outer body that can be coupled to the suction turbine comprising an open front end, a rear end connected to at least one orifice for the passage of an air flow from the outer body towards the suction turbine and a surface that joins both ends; and
  a cartridge partially disposed in the interior of the outer body that comprises, in turn:
    an open front end for suctioning the faeces, a closed rear end and a surface that joins the front and rear ends;
    at least one opening disposed on the surface for the passage of an air flow from the interior of the cartridge to the interior of the outer body, which does not limit the cross-section of the filter to the diameter or cross-section of the conduit, enabling a filtering area of the appropriate size to improve performance; and
    filtering material disposed in said opening in such a manner as to prevent the passage of faeces through said opening.

With the object of allowing passage of the suction air flow between the outer body and the cartridge, both are configured in such a manner as to comprise a ring-shaped space between the surfaces of both for the circulation of the air flow towards the suction turbine.

Therefore, on actuating the turbine, suction is produced in such a manner that an air flow with faeces is introduced through the front end of the cartridge. Once inside, said air flow is capable of passing through the opening of the cartridge, while the faeces are trapped in the interior of the cartridge due to the filtering material. Both the cartridge and the cartridge-outer body assembly can be disposable, in such a manner that the user does not come into contact with the faeces and the disposable element would be separated from suction turbine and disposed of, subsequently introducing a new disposable element.

According to the foregoing statements, the disposable assembly can be limited to the cartridge, which would be replaced after each use. This solution avoids contact with the residue, preventing the user from coming into contact with the faeces, and also enables high suction performance, due to which the device may be small and light (portability), easy to manage because it does not have to be opened, prevents any component of the vacuum from becoming soiled and reduces the number of parts to be disposed of after each use. Also, the ring-shaped space between the two elements enables the creation of a high-speed laminar flow that collects the residue suctioned inside the cartridge.

Another object of the invention is the disposable cartridge, which is disposed inside the outer body coupled to the suction turbine and, according to the foregoing statements, comprises:

an open front end for suctioning the faeces, a closed rear end and a surface that joins the front and rear ends;
at least one opening disposed on the surface for the passage of an air flow from the interior of the cartridge to the interior of the outer body; and
filtering material disposed in said opening in such a manner as to prevent the passage of faeces through said opening.

As a result, the cartridge is configured in the assembly position, in such a manner that it comprises a ring-shaped space between the surfaces of the cartridge and the outer body to enable circulation of the air flow towards the suction turbine.

Lastly, another object of the invention is the vacuum, which comprises a suction turbine and the filtering device that can be coupled to the previously described suction turbine.

DESCRIPTION OF THE DRAWINGS

In order to complete the description being made and with the object of helping to better understand the characteristics of the invention, in accordance with a preferred embodiment thereof, accompanying said description as an integral part thereof, is a set of drawings wherein the following has been represented in an illustrative and non-limiting manner.

PREFERRED EMBODIMENT OF THE INVENTION

Figure 1:
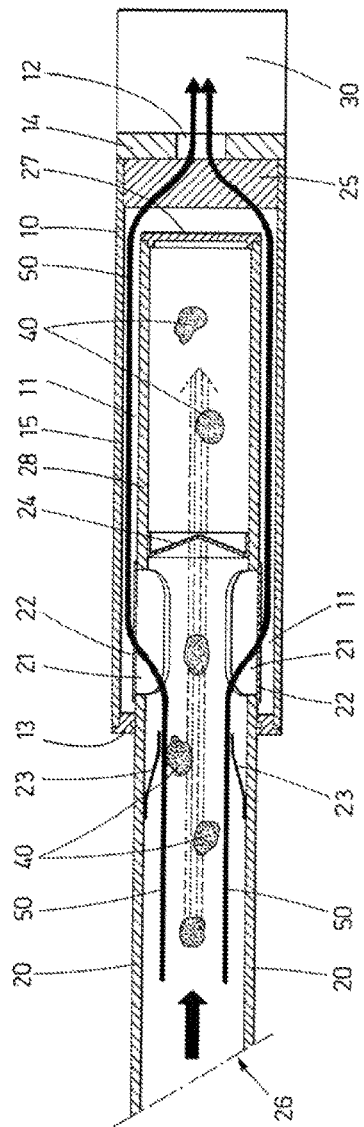
FIG. 1 shows a schematic view of a cross-section of a first embodiment of the filtering device object of the invention.
Figure 2:
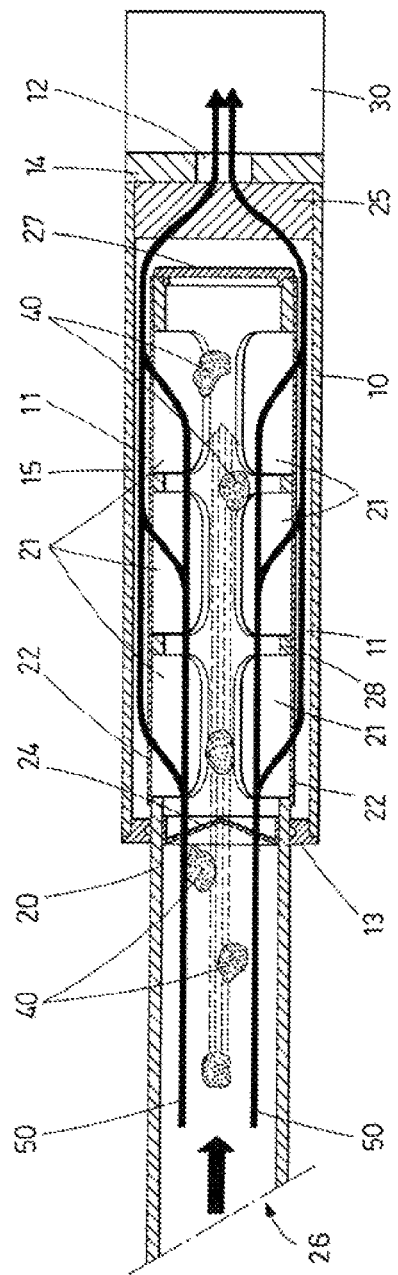
FIG. 2 shows a schematic view of a cross-section of a second embodiment of the filtering device object of the invention.

Both FIG. 1 and FIG. 2 show embodiments of a filtering device according to the object of the invention. The device can be coupled to a suction turbine (30) for suctioning faeces (40), in such a manner that extraction thereof from the suction turbine (30) and, therefore, disposal thereof, is possible.

In both embodiments shown in the figures, the device comprises the following elements:

the outer body (10), which is disposed coupled to the suction turbine (30); and
the cartridge (20), which is partially disposed in the interior of the outer body (10).

There is a ring-shaped space (11) between the surfaces (15, 28) of the outer body (10) and the cartridge (20) which allows circulation of the air flow (50) between the two bodies (10, 20) towards the orifice (12) for the passage of the air flow (50) from the outer body (10) towards the suction turbine (30).

The cartridge (20) also comprises:

at least one opening (21) disposed on its surface (28), in such a manner that once the suction turbine (30) is actuated, the air flow (50) is capable of passing from the cartridge (20) through the opening (21) towards the ring-shaped space (11) comprised between the outer body (10) and the cartridge (20); and
a filtering material (22) disposed in the aforementioned opening (21), in such a manner that the air flow (50) passes therethrough (22) but the residue (40) would be trapped in the filtering material (22).

Additionally, the suction turbine (30) has greater suction capacity than conventional turbines, as it is a suction turbine (30) having an impeller with variable geometry such that it produces high depression values with reduced volume. This facilitates the transport of the faeces vacuum while walking the dog. Also, the suction turbine (30) is actuated by a high-speed motor, in such a manner that it is capable of generating depression values such as to ensure complete suctioning of the faeces (40).

In the embodiment corresponding to FIG. 1, the cartridge (20) comprises openings (21) disposed in opposition to each other and a protuberance (23) disposed in front of the openings (21) in the air flow suction direction (50). The purpose of said protuberance (23) is to create a narrowing of the internal cartridge (20) diameter and, therefore, the air flow (50), achieving a Venturi effect, in such a manner as to accelerate said air flow (50) and, due to the fact that the residue (40) has greater density than the air, they are accelerated and centred in the cartridge (20), thereby moving away from the openings (21), while less dense air is expelled through the openings (21). This ensures that the faeces (40) do not move towards the openings (21), saturating the filter (22) and therefore reducing vacuum suctioning capacity.

FIG. 2 shows a second embodiment wherein the cartridge (20) comprises a plurality of openings (21) disposed on the surface (28) thereof. It therefore has an air flow passage area (50) greater than that of the cartridge (20) of the embodiment shown in FIG. 1.

Since the aforementioned protuberances (23) do not exist, the purpose of which is to keep the residue (40) away from the openings (21), said residue (40) would remain on the inner walls of the cartridge (20) and deposited in the filtering material (22). Due to the large surface area of the filtering material (22) it would not become clogged.

The two embodiments are also characterised in that the inner bodies (20) comprise non-return valves (24) that prevent the residue (40) from exiting. In the embodiment shown in FIG. 1, the non-return valve (24) is disposed after the opening (21), while in the embodiment corresponding to FIG. 2 it is disposed before the openings (21).

The filtering device shown is also characterised in that it comprises an anti-odour filter (25) disposed in the passage between the outer body (10) and the suction turbine (30).

Figure 3:
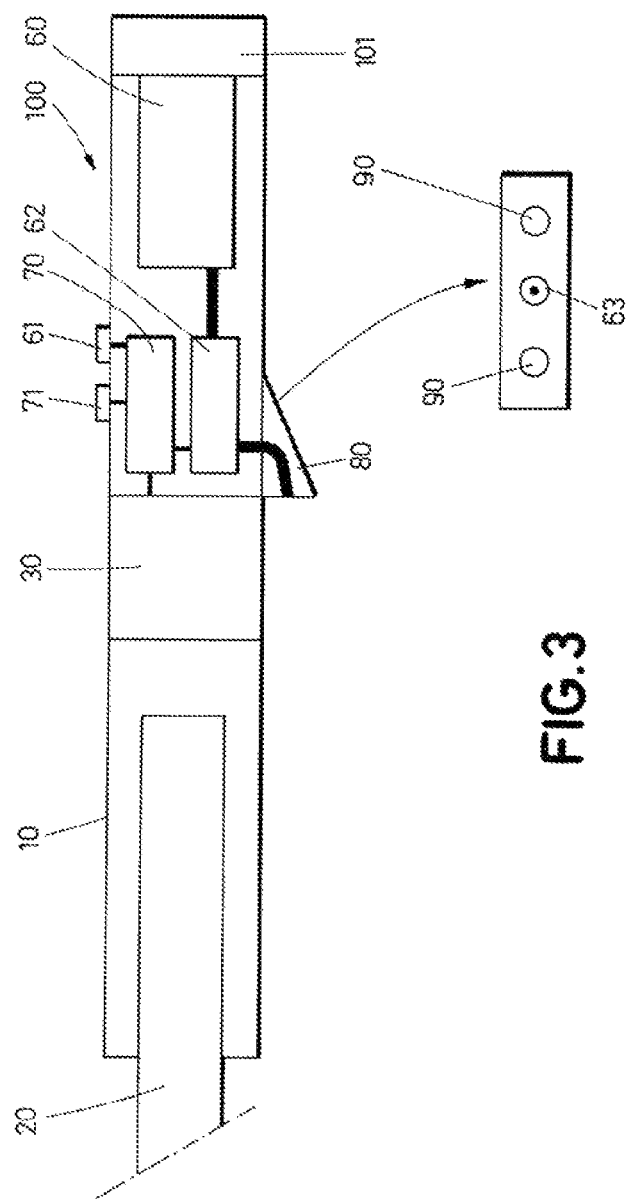
FIG. 3 shows a schematic view of a vacuum according to an embodiment of the invention.

FIG. 3 shows a vacuum that also comprises a lighting system, as well as a disinfectant dosing device. This lighting system and the aforementioned dosing device may be applied to any type of vacuum used to suction faeces, regardless of the filtering device used. Likewise, dosage may be carried out both manually and electrically.

The vacuum represented in FIG. 3 comprises a lighting system comprising at least one lamp (90) disposed on a projection (80) for projecting a light beam toward the front part of the vacuum.

Likewise, it comprises a disinfectant dosing device comprising a disinfectant receptacle (60) connected to a pump (62) which is in turn connected to an output nozzle (63) and a control element (70) for dosing the disinfectant.

The disinfectant receptacle (60), the pump (62) and the control element (70) are disposed in the interior of a chamber (100) disposed at the rear of the vacuum, which in turn comprises a lid (101) for accessing the disinfectant receptacle (60) and the output nozzle (63) of the disinfectant is disposed on the projection (80) for dosing a quantity of disinfectant towards the front part of the vacuum. Push-buttons are disposed on the exterior of the aforementioned chamber (100), a push-button for suctioning (71) and a push-button for disinfecting (61).

The invention claimed is:

1. A filtering device intended to be coupled to a suction turbine for suctioning faeces comprising:
    an outer body intended to be coupled to the suction turbine, the outer body comprising: an open front end, a rear end connected to at least one orifice for allowing the passage of an air flow from the outer body towards the suction turbine; and a surface that joins both ends;
    a disposable cartridge comprising:
        an open front end, outwardly projecting in longitudinal direction from the outer body for suctioning the faeces, a closed rear end located inside the outer body; and a surface that joins the front and rear ends;
        at least one window-shaped opening disposed on the surface for allowing the passage of an air flow from the interior of the cartridge to the interior of the outer body; and
        filtering material covering the opening so as to prevent the passage of faeces through said opening, and
    a ring-shaped space defined between the surfaces of the outer body and the cartridge for allowing the circulation of the air flow from the first end of the cartridge towards the suction turbine.

2. The device of claim 1, wherein the cartridge comprises at least one internal protuberance disposed before the opening, in the suction direction, which creates a narrowing of the inner diameter of the cartridge.

3. The device of claim 2, wherein the cartridge comprises a non-return valve for preventing the suctioned faeces from exiting through the front end and wherein the non-return valve is disposed after the opening, in the suction direction.

4. The device of claim 1, wherein the cartridge comprises a non-return valve for preventing the suctioned faeces from exiting through the front end.

5. The device of claim 4, wherein the non-return valve is disposed just before the opening, in the suction direction.

6. The device of claim 1, further comprising an anti-odour filter in the passage between the outer body and the suction turbine.

7. A vacuum comprising a suction turbine further comprising a filtering device intended to be coupled to the suction turbine for suctioning faeces comprising:
    an outer body intended to be coupled to the suction turbine, the outer body comprising: an open front end, a rear end connected to at least one orifice for allowing the passage of an air flow from the outer body towards the suction turbine; and a surface that joins both ends;
    a disposable cartridge comprising:
        an open front end, outwardly projecting in longitudinal direction from the outer body for suctioning the faeces, a closed rear end located inside the outer body; and a surface that joins the front and rear ends;
        at least one window-shaped opening disposed on the surface for allowing the passage of an air flow from the interior of the cartridge to the interior of the outer body; and
        filtering material covering the opening so as to prevent the passage of faeces through said opening, and
    a ring-shaped space defined between the surfaces of the outer body and the cartridge for allowing the circulation of the air flow from the first end of the cartridge towards the suction turbine.

8. The vacuum of claim 7 further comprising a lighting system comprising at least one lamp disposed on a projection for projecting a light beam toward the front part of the vacuum.

9. The vacuum of claim 8 further comprising a disinfectant dosing device comprising a disinfectant receptacle connected to a pump, which is in turn connected to an output nozzle and a control element for dosing the disinfectant.

10. The vacuum of claim 9 wherein the disinfectant receptacle, the pump and the control element are disposed in the interior of a chamber disposed at the rear of the vacuum, which in turn comprises a lid for accessing the disinfectant receptacle.

11. The vacuum of claim 10 wherein the output nozzle of the disinfectant is disposed on a projection for dosing a quantity of disinfectant towards the front part of the vacuum.

12. The vacuum of claim 9 wherein the output nozzle of the disinfectant is disposed on a projection for dosing a quantity of disinfectant towards the front part of the vacuum.

13. The vacuum of claim 7 further comprising a disinfectant dosing device comprising a disinfectant receptacle connected to a pump, which is in turn connected to an output nozzle and a control element for dosing the disinfectant.

14. The vacuum of claim 13 wherein the disinfectant receptacle, the pump and the control element are disposed in the interior of a chamber disposed at the rear of the vacuum, which in turn comprises a lid for accessing the disinfectant receptacle.

15. The vacuum of claim 14 wherein the output nozzle of the disinfectant is disposed on a projection for dosing a quantity of disinfectant towards the front part of the vacuum.

16. The vacuum of claim 13 wherein the output nozzle of the disinfectant is disposed on a projection for dosing a quantity of disinfectant towards the front part of the vacuum.

17. The vacuum of claim 7, wherein the cartridge comprises at least one internal protuberance disposed before the opening, in the suction direction, which creates a narrowing of the inner diameter of the cartridge.

18. The vacuum of claim 17, wherein the cartridge comprises a non-return valve for preventing the suctioned faeces from exiting through the front end and wherein the non-return valve is disposed after the opening, in the suction direction.

19. The vacuum of claim 7, further comprising an anti-odor filter in the passage between the outer body and the suction turbine.

* * * * *